(12) United States Patent
Kawase et al.

(10) Patent No.: US 9,077,017 B2
(45) Date of Patent: Jul. 7, 2015

(54) PRISMATIC CELL

(75) Inventors: Satomi Kawase, Aichi-ken (JP); Tomonori Makino, Toyohashi (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 570 days.

(21) Appl. No.: 12/991,184

(22) PCT Filed: Apr. 13, 2009

(86) PCT No.: PCT/JP2009/057448
§ 371 (c)(1),
(2), (4) Date: Nov. 5, 2010

(87) PCT Pub. No.: WO2009/139251
PCT Pub. Date: Nov. 19, 2009

(65) Prior Publication Data
US 2011/0059344 A1    Mar. 10, 2011

(30) Foreign Application Priority Data
May 13, 2008 (JP) ................... 2008-126346

(51) Int. Cl.
*H01M 10/02* (2006.01)
*H01M 2/10* (2006.01)
(Continued)

(52) U.S. Cl.
CPC .......... *H01M 2/1072* (2013.01); *H01M 2/0202* (2013.01); *H01M 2/0277* (2013.01); *H01M 10/0525* (2013.01); *H01M 10/0587* (2013.01);
(Continued)

(58) Field of Classification Search
CPC ............ H01M 2/1072; H01M 2/0202; H01M 2/0277; H01M 10/0525; H01M 10/0587; H01M 2002/0205; Y20E 60/122

USPC ................................................... 429/94, 162
See application file for complete search history.

(56) References Cited

U.S. PATENT DOCUMENTS

| 6,232,015 | B1 | 5/2001 | Wyser |
| 2003/0013011 | A1* | 1/2003 | Shoji et al. .................... 429/142 |

(Continued)

FOREIGN PATENT DOCUMENTS

| JP | 8-115729 | 5/1996 |
| JP | 11-191400 | 7/1999 |

(Continued)

OTHER PUBLICATIONS

International Search Report in International Application No. PCT/JP2009/057448; Mailing Date: Jul. 21, 2009.

*Primary Examiner* — Miriam Stagg
*Assistant Examiner* — Brent Thomas
(74) *Attorney, Agent, or Firm* — Finnegan, Henderson, Farabow, Garrett & Dunner, LLP (57) ABSTRACT

This cell comprises an electrode unit, a cell case in which the electrode unit is housed, and an insulated outer covering located between the electrode unit and the cell case. The electrode unit is housed, from an opening formed at an upper end of the cell case, in the cell case in a lateral direction in which a positive electrode collection component and a negative electrode collection component are disposed along from the upper end to the bottom at both ends of a wide face of the cell case, and is disposed inside the outer covering, to constitute an electrode insertion unit along with the outer covering. Here, the thickness (L1a) of the electrode insertion unit at both ends in the lateral direction steadily decreases from the upper end toward the bottom of the cell case.

6 Claims, 4 Drawing Sheets

(51) Int. Cl.
*H01M 2/02* (2006.01)
*H01M 10/0525* (2010.01)
*H01M 10/0587* (2010.01)

(52) U.S. Cl.
CPC ...... *H01M 2002/0205* (2013.01); *Y02E 60/122* (2013.01)

(56) References Cited

U.S. PATENT DOCUMENTS

2005/0277022 A1* 12/2005 Kozuki .......................... 429/211
2006/0024578 A1* 2/2006 Lee ............................... 429/208
2006/0208700 A1* 9/2006 Kim et al. ..................... 320/128

FOREIGN PATENT DOCUMENTS

| | | |
|---|---|---|
| JP | 2000-67821 | 3/2000 |
| JP | 2003-249423 | 9/2003 |
| JP | 2006-40901 | 2/2006 |
| JP | 2006-278245 | 10/2006 |
| JP | 2006-351383 | 12/2006 |

* cited by examiner

PRISMATIC CELL

CROSS-REFERENCE TO RELATED APPLICATIONS

This application is a national phase application of International Application No. PCT/JP2009/057448, filed Apr. 13, 2009, and claims the priority of Japanese Application No. 2008-126346, filed May 13, 2008, the contents of both of which are incorporated herein by reference.

TECHNICAL FIELD

The present invention relates to a prismatic cell comprising an electrode unit with a flat shape and a cell case formed in a box shape corresponding to the shape of the electrode unit. More particularly, the present invention relates to the structure of a prismatic cell that is favorable for installation in vehicles. This application claims priority on the basis of Japanese Patent Application No. 2008-126346 filed on May 13, 2008, the content of which is incorporated herein by reference in its entirety.

BACKGROUND ART

In recent years there has been growing demand for lithium ion cells, nickel hydrogen cells, and other secondary cells for use as power supplies installed in vehicles, or as power supplies for personal computers and portable terminals. In particular, lithium ion cells, which are lightweight and offer high energy density, hold promise for favorable use as high-output power supplies installed in vehicles. With this type of cell, a known cell structure comprises a sheet-form positive electrode (hereinafter also referred to as a positive electrode sheet) and a sheet-form negative electrode (hereinafter also referred to as a negative electrode sheet) are laminated along with a sheet-form separator and wound into a wound electrode unit. For example, Japanese Patent Application Laid-Open No. 2003-249423 (Patent Document 1) discloses a cell comprising a wound electrode unit with a flat shape in which a positive electrode sheet and a negative electrode sheet are wound via a separator.

Patent Document 1: Japanese Patent Application Laid-Open No. 2003-249423

With this type of cell, however, the flat electrode unit and the cell case have to be manufactured separately, and the electrode unit then housed in the cell case. The cell case is usually made from metal since metals have higher physical strength, and in this case, a step in which the electrode unit is encased in an outer covering (such as an insulating film) is typically carried out to insulate the metal case from the electrode unit. As an example of a cell manufacturing processing that includes this encasing step, a cell is constructed as follows. First, a flat electrode unit is housed (encased) in a flat, box-shaped outer covering that corresponds to the shape of the electrode unit, and then this outer covering is housed along with the electrode unit in a cell case, after which the opening at the upper end of the cell case is closed off with a lid to construct a cell.

However, with a conventional cell constitution, since the outer covering is in the form of a box having corners, it was difficult to insert the outer covering (and the electrode unit) into the cell case. For example, if the corners (the four corners) in a plan view of the cell case had a rounded shape (R-shape), the corners of the outer covering interfered with the corners of the cell case, making it difficult to insert the electrode unit housed in the outer covering. Also, with an electrode unit constituted in this way, during insertion into the cell case, in some cases there was the risk of wrinkling, bending (buckling), tearing, or the like in the outer covering. If this should happen, the insulating function of the outer covering is impaired, and there is the risk that insulation between the electrode unit and the cell case will be lost and an internal short will occur, so wrinkling and so forth of the outer covering needs to be prevented.

DISCLOSURE OF THE INVENTION

The present invention was conceived in light of this, and its main object is to provide a prismatic cell comprising a flat electrode unit and an outer covering of the same shape, which is easy to insert into a cell case, with good insulation ensured between the electrode unit and the cell case in this cell.

To achieve the stated object, the prismatic cell provided by the present invention comprises an electrode unit with a flat shape and a box-like cell case (typically a flat, box-shaped case) in which this electrode unit is housed. The center portion of the electrode unit in a specific direction as viewed from a wide face thereof forms an active material layer provision component in which are laminated a portion where a positive electrode active material layer is provided and a portion where a negative electrode active material layer is provided. Also, of the two ends of the active material layer provision component as viewed from the wide face, one end forms a positive electrode collection component in which is laminated a portion where no positive electrode active material layer is provided and where a positive electrode collector is exposed, and the other end forms a negative electrode collection component in which is laminated a portion where no negative electrode active material layer is provided and where a negative electrode collector is exposed. An outer covering that corresponds to the shape of the electrode unit and that is an insulated outer covering for isolating the electrode unit from the cell case is provided between the electrode unit and the cell case. The electrode unit is housed, from an opening formed at an upper end of the cell case, in the cell case in a lateral direction in which the positive electrode collection component and the negative electrode collection component are disposed along from the upper end to the bottom at both ends of a wide face of the cell case, and is disposed inside the outer covering in the cell case, to constitute a flat, box-like electrode insertion unit along with the outer covering. Here, the thickness of the electrode insertion unit at both ends in the lateral direction steadily decreases from the upper end toward the bottom of the cell case.

With a cell thus constituted, the electrode insertion unit, which is composed of an outer covering corresponding to the shape of the electrode unit (typically a flat, box-shaped case) and a flat, box-like electrode unit that is disposed (housed) inside this outer covering, has a thickness at both ends in the lateral direction that steadily decreases from the upper end toward the bottom of the cell case. Specifically, at both ends of the electrode insertion unit in the lateral direction (and a specific region including the two ends), the end faces thereof (or a vertical cross section obtained by cutting in the thickness direction perpendicular to the lateral direction) have a tapered shape (V shape). Therefore, the thickness of the two ends on the bottom side is less than the length in the thickness direction at the opening formed at the upper end of the inner wall face of the cell case. This has the following effect. First, since this electrode insertion unit has two ends shaped as above, it can be housed more easily from the opening than with an electrode insertion unit having a simple cuboid shape (that is, one in which the vertical cross section or the end faces of the two ends are rectangular). Also, the upper end of the above-mentioned outer covering constituting the electrode insertion unit is typically open, and the electrode unit can be disposed by insertion, for example, from this open portion. The length in the thickness direction of the outer covering, which has the same shape as the electrode insertion unit, also increases more on the upper end (opening) side than on the bottom side, so the electrode unit can be easily disposed in the interior by being inserted into the outer covering.

Furthermore, with a cell thus constituted, when the electrode insertion unit is inserted into the cell case, there is no interference between the electrode insertion unit and the inner wall faces and so forth that make up the internal space of the cell case or the opening at the upper end of the case, so wrinkling, bending, tearing, and so forth can be prevented from occurring in the outer covering (such as an insulating film composed of a sheet of resin material) of the electrode insertion unit. Accordingly, this prevents the adverse effects (such as internal short circuits) on cell performance that wrinkling and the like that can occur during the insertion of the electrode insertion unit would otherwise have.

In one preferred mode of the cell disclosed herein, in the electrode insertion unit, the thickness of the center portion excluding the two ends in the lateral direction is substantially constant from the upper end toward the bottom of the cell case.

With a cell thus constituted, the thickness of the center portion other than the two ends of the electrode insertion unit in the lateral direction (the portion flanked by the two ends, which is a specific portion including the middle in the lateral direction as its center) is constant from the upper end toward the bottom of the cell case, and corresponds to the length along the thickness direction at the opening of the cell case. Specifically, in the center portion other than the two ends, a vertical cross section obtained by cutting along the thickness direction has a U shape rather than a V shape (taper). Accordingly, when the electrode unit is disposed inside the outer covering, the electrode unit can be made to correspond to the shape of the outer covering merely by steadily decreasing the thickness of the two ends of the electrode unit. Doing this allows the electrode unit to be easily disposed inside the outer covering without excessive deformation of the electrode unit, and makes it possible to avoid the adverse effect on cell performance that would accompany excessive deformation of the electrode unit.

As another preferred mode of the cell disclosed here, in the electrode insertion unit, the thickness of the electrode insertion unit steadily decreases from the side closer to the center in the lateral direction toward the two ends in a specific region including the two ends in the lateral direction, and the degree of the steady decrease gradually increases in a direction extending from the upper end toward the bottom of the cell case, which is a direction that is perpendicular to the lateral direction.

With a cell thus constituted, in a specific region including the two ends in the lateral direction, the thickness of the electrode insertion unit steadily decreases from the side closer to the center in the lateral direction toward the two ends. Specifically, the lateral cross sectional shape of the electrode insertion unit along the lateral direction is a flattened octagonal shape such as if obtained by cutting off the corners (the four corners) of a flat rectangular shape. In addition, since the degree of the steady decrease in thickness increases from the upper end toward the bottom of the cell case, a lateral cross section at the bottom, where the degree of the steady decrease is greatest, has a shape in which the notching of the corners (the cut off portions) is greatest.

Consequently, when the electrode insertion unit with the above shape is housed (such as by insertion) in a cell case whose bottom corners have a rounded shape, the two ends of the electrode insertion unit in the lateral direction, and particularly at the bottom, will not interfere with the corners of the cell case, allowing the electrode insertion unit to be smoothly inserted and housed. As a result, it is possible to prevent the occurrence of problems such as wrinkling, bending, tearing, or deformation caused by interference at the two ends in the lateral direction of the electrode unit or in the outer covering constituting the electrode insertion unit.

Also, in the case of an electrode insertion unit that is flat and has a simple cuboid shape, since the lateral cross sectional shape thereof is rectangular, the overall size of the electrode unit constituting the electrode insertion unit was reduced so that the corner portions thereof would not interfere with the corners of the cell case. With a cell thus constituted, however, in the lateral cross sectional shape of the electrode insertion unit, and particularly at the bottom, the four corners of the above-mentioned rectangular shape are cut off, so interference between the respective corners is avoided. Therefore, the size of the electrode unit can be correspondingly increased, and a cell thus constituted with have a larger capacity.

As an example of a preferred application of the technology disclosed herein, the electrode unit is a wound electrode unit in which a positive electrode, comprising a positive electrode active material layer provided to a sheet-form positive electrode collector, and a negative electrode, comprising a negative electrode active material layer provided to a sheet-form negative electrode collector, are laminated via a separator and wound. The winding axial direction of the electrode unit is parallel to the lateral direction. The center portion of the electrode unit in the winding axial direction forms an active material layer provision component in which are laminated a portion where a positive electrode active material layer is provided and a portion where a negative electrode active material layer is provided. Of the two ends in the winding axial direction, one end forms a positive electrode collection component in which is laminated a portion where no positive electrode active material layer is provided and where the positive electrode collector is exposed, and the other end forms a negative electrode collection component in which is laminated a portion where no negative electrode active material layer is provided and where the negative electrode collector is exposed.

In a preferred mode of a cell equipped with an electrode unit thus constituted, the portions of the electrode insertion unit in which the thickness at both ends in the winding axial direction steadily decreases from the upper end toward the bottom of the cell case correspond to the positive electrode collection component and the negative electrode collection component, respectively. With a cell thus constituted, when the electrode unit is inserted and disposed inside the outer covering constituting the electrode insertion unit, a specific region including the two ends of the electrode insertion unit in the winding axis direction (that is, the lateral direction) is easily formed in the above-mentioned shape, and this shape can be maintained. Therefore, a shape of the electrode insertion unit that is easy to house in the cell case can be maintained.

Also, when the electrode unit constituted as above was housed directly in the cell case, the cell case and the electrode unit tended to interfere with each other, particularly at the positive electrode collection component and the negative electrode collection component, and there was the risk that the collection components would undergo tearing or other such problems. With a cell thus constituted, however, since the electrode unit can be housed in the cell case as an electrode insertion unit with the above shape, this risk is eliminated, and the above-mentioned electrode unit problems can be avoided.

Here, in the electrode insertion unit, the center portion in the winding axis direction typically corresponds to the active material layer provision component of the electrode unit, and the thickness of the electrode insertion unit at this center portion corresponds to the thickness of the active material layer provision component. Since the active material layer provision component of the electrode unit is the portion where the active material layers of the positive electrode and negative electrode are laminated via a separator, it is difficult to adjust this thickness by deforming this portion. However, since the thickness of the center portion of the electrode insertion unit is constant from the upper end of the cell case to the bottom, and corresponds to the thickness of the active material layer provision component, when the electrode unit is housed inside the outer covering of the electrode unit, it can be easily housed (inserted), and after insertion the overall shape of the electrode insertion unit can be maintained, with no major deformation of the electrode unit.

As another preferred mode of the cell disclosed here, the outer covering is formed from a sheet-form insulating resin material.

With a cell thus constituted, since the outer covering is formed from a sheet of insulating resin material, if the sheet made of this resin material is folded, etc., it can be easily made in a shape with which the outer covering can be easily inserted into the cell case and wrinkling and so forth can be prevented. Also, using a sheet of resin material for the outer covering allows the space accounted for by the outer covering in the interior of the cell case (that is, the gap between the electrode unit and inner wall faces of the cell case) to be kept to a minimum. Accordingly, the electrode unit can be made correspondingly larger, and a cell with a larger capacity can be produced.

With all of the cells disclosed here, even with a constitution comprising an outer covering as discussed above, interference between the outer covering and the cell case can be avoided, and good cell performance can be exhibited in which insulation between the cell case and the electrode unit is ensured, so these cells can be used to advantage as cells that are installed in vehicles (such as power supplies for automobiles and other such vehicles). Therefore, the present invention provides a vehicle equipped with any of the cells disclosed herein.

BEST MODE FOR CARRYING OUT THE INVENTION

Preferred embodiments of the present invention will now be described through reference to the drawings. Matters that are necessary for working the present invention, other than matters specifically mentioned in this Specification (such as general technology related to the construction of cells, the constitution of cells and their construction procedures, and so on) can be ascertained as design matters for a person skilled in the art on the basis of prior art in this field. The present invention can be worked on the basis of technical common knowledge in this field and the content of the disclosure in this Specification.

The term "cell" in this Specification refers to a storage device from which a specific electrical energy can be taken off, and is not limited to any specific collecting mechanism (electrode unit or electrolyte constitution). Specifically, it is a term that encompasses so-called chemical cells such as lithium secondary cells, lithium ion cells, nickel hydrogen cells, nickel cadmium cells, and lead storage cells, as well as electric double layer capacitors and various other storage elements (physical cells) used similarly in the same industrial fields as chemical cells.

Embodiments of the present invention will now be described through reference to the drawings. In the following references to the drawings, members and locations that perform the same action are numbered the same.

The cell pertaining to the present invention will be described in detail by using a lithium ion cell 100 with a prismatic shape as an example, but this is not intended to limit the present invention to what is discussed in the embodiments. The dimensional relations (length, width, thickness, etc.) in the drawings do not reflect the actual dimensional relations.

Figure 1:
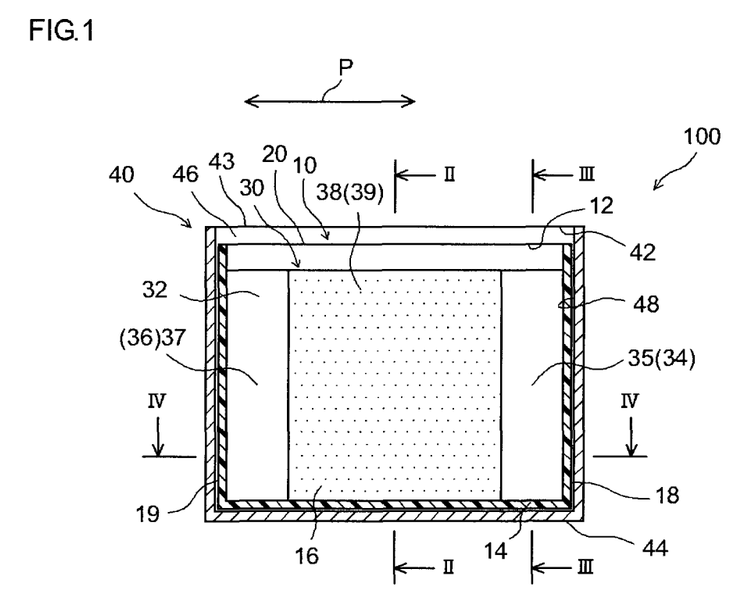
FIG. 1 is a front cross section schematically illustrating a state in which an electrode insertion unit, composed of an electrode unit and an outer covering in which this electrode unit is disposed, is housed in a cell case.
Figure 2:
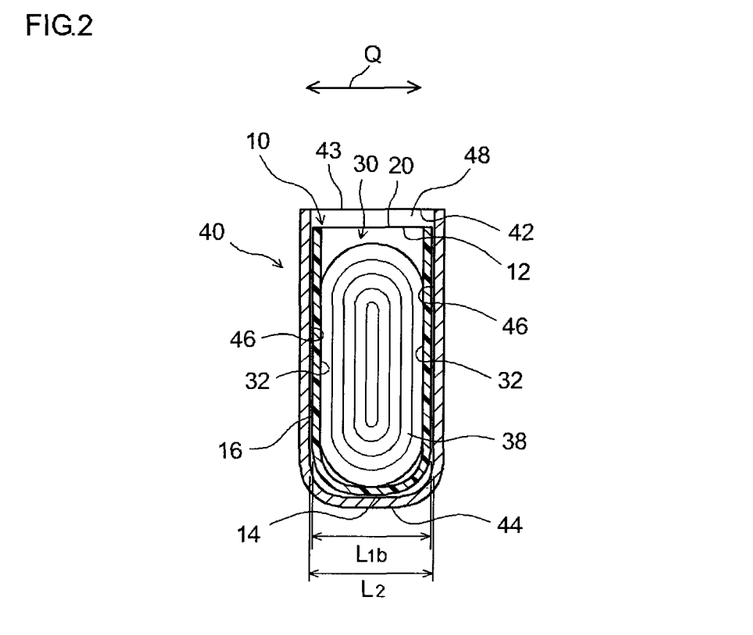
FIG. 2 is a cross section along the II-II line in FIG. 1.
Figure 3:
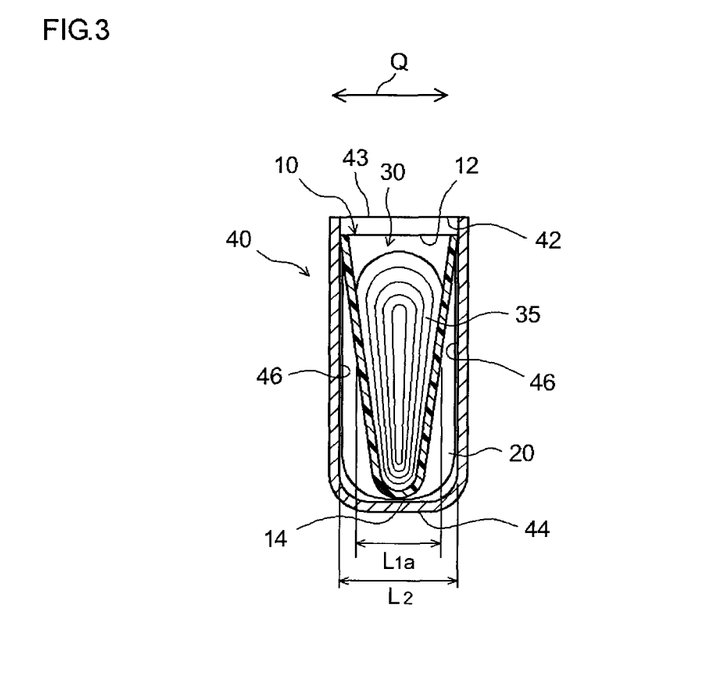
FIG. 3 is a cross section along the line in FIG. 1.
Figure 4:
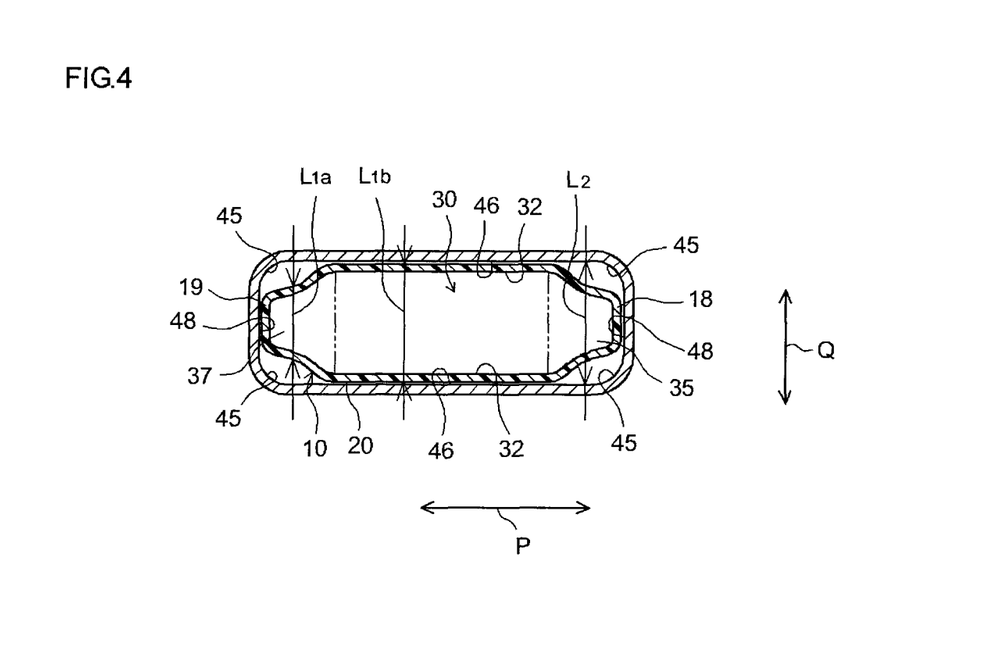
FIG. 4 is a cross section along the IV-IV line in FIG. 1.
Figure 5:
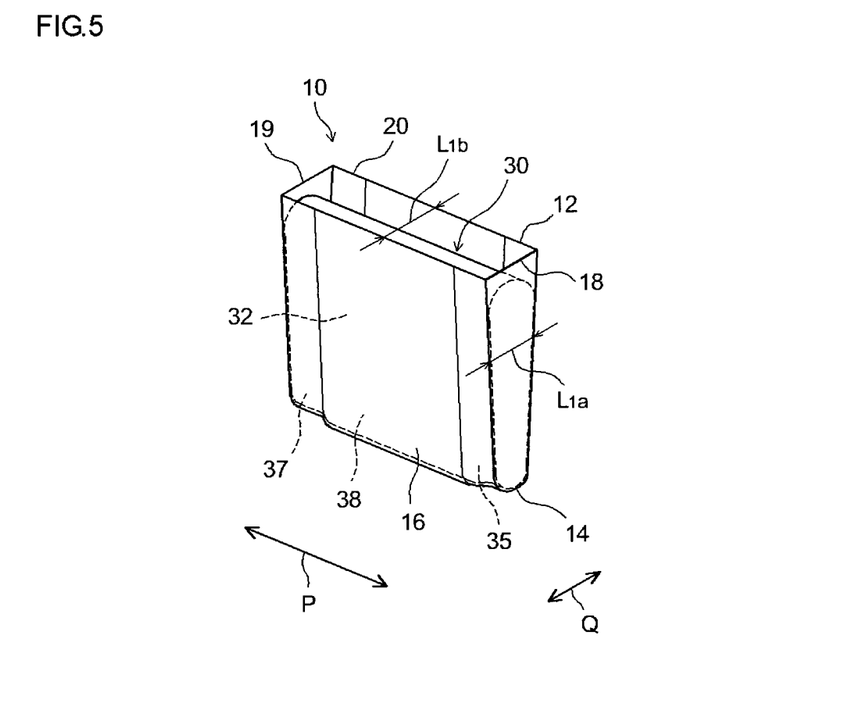
FIG. 5 is an overall simplified oblique view of an electrode insertion unit.

The constitution of the cell 100 pertaining to this embodiment will be described through reference to FIGS. 1 to 5. FIG. 1 is a front cross section schematically illustrating a state in which an electrode insertion unit 10, composed of an electrode unit 30 and an outer covering 20 in which this electrode unit 30 is disposed, is housed in a cell case 40. FIG. 2 is a cross section along the II-II line in FIG. 1. FIG. 3 is a cross section along the III-III line in FIG. 1. FIG. 4 is a cross section along the IV-IV line in FIG. 1. FIG. 5 is an overall simplified oblique view of the electrode insertion unit 10.

As shown in FIG. 1, which illustrates a preferred embodiment (an embodiment of the present invention) of the cell 100, the lithium ion cell 100 disclosed herein comprises an electrode unit 30 that has a flat shape and is equipped with a positive electrode and a negative electrode, and a cell case 40 that has a flat, box-like shape that corresponds to the shape of the electrode unit 30 and in which the electrode unit 30 and electrolyte are housed. The electrode unit 30 is disposed (housed) inside the outer covering 20, which has a flat, box-like shape that corresponds to the shape of the electrode unit 30, and constitutes the electrode insertion unit 10 along with the outer covering 20. The electrode unit 30 is disposed inside the cell case 40 in a state of being housed in the outer covering 20, that is, as the electrode insertion unit 10. With the cell case 40 pertaining to this embodiment, as discussed below, an opening 43 is formed at an upper end 42, and the cell 100 can be equipped with a lid for closing off this opening 43, but since this is not a characteristic feature of the present invention, this lid is not depicted.

As shown in FIGS. 1 to 4, with the cell case 40 pertaining to this embodiment, the space (internal space) surrounded by the inner wall faces of the case are formed in a flat, box-like shape (prismatic shape) corresponding to the shape of the flat electrode insertion unit 10. The above-mentioned inner wall faces of the cell case 40 consist of a flat, substantially rectangular bottom face (bottom 44), two wide faces 46 that are opposite each other and rise up from the ends in the lengthwise direction of the bottom 44, and two narrow faces 48 that are opposite each other and rise up from the ends in the widthwise direction of the bottom 44. Corner components 45 are formed in the four inside corners formed by the wide faces 46 and the narrow faces 48, and these corner components 45 have a rounded shape (R-shape). As discussed above, the upper end 42 of the cell case 40 serves as the opening 43 into which the electrode insertion unit 10 (the electrode unit 30) can be inserted.

A metal material that is lightweight, has good thermal conductivity, and has high strength can be employed favorably as the material for the cell case 40. Examples of such metal materials include aluminum (including aluminum alloys), stainless steel, and nickel-plated steel. Aluminum is typically used.

The electrode unit 30 with a flat shape is constituted by laminating a positive electrode (positive electrode sheet) 34 produced by providing a positive electrode active material layer to a sheet of a positive electrode collector, and a negative electrode (negative electrode sheet) 36 produced by providing a negative electrode active material layer to a sheet of a negative electrode collector, with a separator 39 in between. As shown in FIG. 1, the electrode unit 30 comprises an active material layer provision component 38 formed in the center portion in a specific direction when viewed from a wide face 32 thereof, a positive electrode collection component 35 formed at the end on one of the two sides of the active material layer provision component 38 as viewed from the wide face 32, and a negative electrode collection component 37 formed at the end on the other side. With the active material layer provision component 38, the portion where the positive electrode active material layer is provided and the portion where the negative electrode active material layer is provided are laminated. With the positive electrode collection component 35 and the negative electrode collection component 37, the portions where no positive electrode active material layer or negative electrode active material layer is provided and where the positive electrode collector and the negative electrode collector are exposed are laminated, with these portions sticking out from the respective ends out of the two ends of the active material layer provision component 38.

The electrode unit 30 is housed in the cell case 40 as the electrode insertion unit 10. The electrode unit 30 here is housed inside the cell case 40 so that its wide face 32 is opposite the wide faces 46 of the cell case 40, and so that the positive electrode collection component 35 and the negative electrode collection component 37 are disposed along from the upper end 42 to the bottom 44 at both ends of the wide faces 46 of the cell case 40. Also, in the electrode unit 30 housed in the cell case 40, the positive electrode collection component 35 and the negative electrode collection component 37 are disposed along (in a strip) the bottom 44 from the upper end 42 of the cell case 40 as viewed from the wide face 32, and the positive electrode collection component 35, the active material layer provision component 38, and the negative electrode collection component 37 follow along (are aligned with) a direction parallel to the wide face 32 and perpendicular to the vertical direction facing the bottom 44 from the upper end 42. This direction shall be termed the lateral direction P.

There are no particular restrictions on the constitution of the electrode unit 30, as long as it has a flat shape and is equipped with the active material layer provision component 38 in the center portion of the lateral direction P as viewed from the wide face 32, and the positive electrode collection component 35 and negative electrode collection component 37 at the ends on both sides thereof. For example, it may be a laminated electrode unit obtained by alternately laminating a plurality of positive electrode sheets and a plurality of negative electrode sheets along with a plurality of separator sheets (or solid or gelled electrolyte layers that can function as separators). It may also be a wound type electrode unit (a wound electrode unit) obtained by laminating a slender positive electrode sheet and a negative electrode sheet via a separator, and winding this laminate in the lengthwise direction. It is preferable to use an electrode unit that has a flat shape obtained by employing a wound electrode unit as the electrode unit 30 pertaining to this embodiment, and flattening it in a direction perpendicular to the winding axis direction. Here, the winding axis direction of the electrode unit (wound electrode unit) 30 pertaining to this embodiment is parallel to (the same as) the above-mentioned lateral direction P.

As to the disposition of the electrode unit 30 housed in the cell case 40, the positive electrode collection component 35 and negative electrode collection component 37 (the lengthwise direction thereof) of the electrode unit 30 are disposed along (in a strip) the lateral direction P as viewed from the wide face 32, and the positive electrode collection component 35, the active material layer provision component 38, and the negative electrode collection component 37 are disposed along the longitudinal direction (typically the vertical direction) facing the bottom 44 (or the upper end 42) from the upper end 42 (or the bottom 44) of the cell case 40, and being a direction perpendicular to the lateral direction P. Specifically, if the electrode unit 30 is a wound electrode unit, it may be disposed so that its winding axis direction is parallel to (the same as) the above-mentioned longitudinal direction (vertical direction). In this case, the positive electrode collection component 35 and the negative electrode collection component 37 are disposed on the upper end 42 side and the bottom 44 side, respectively, but which collection component is disposed on the upper end 42 (or the bottom 44) side may be set as desired, with no particular restrictions. Here, one of the positive electrode collection component 35 or the negative electrode collection component 37, one of which is to be disposed on the bottom 44 side, is preferably flattened in the thickness direction Q so that it is thinner than the other one of the collection components, (which is to be disposed on the upper end 42 side) (preferred particularly if flattened at both ends 18 and 19 in the lateral direction P). Thus reducing the thickness by flattening the collection component disposed on the bottom 44 side makes it easier to insert into the cell case 40.

There are no particular restrictions on the relation between the height of the cell case 40 (the length in the above-mentioned vertical direction) and the height of the electrode unit 30, as long as the electrode unit 30, when housed in the cell case 40, sticks out from the open face (the opening 43) at the upper end 42 of the cell case 40.

The electrode unit 30 is housed in the cell case 40 along with the outer covering 20 in a state in which a positive electrode lead terminal (positive electrode collection terminal; not shown) is connected to the positive electrode collection component 35, and a negative electrode lead terminal (negative electrode collection terminal; not shown) is connected to the negative electrode collection component 37 (such as near the center portion in the longitudinal direction at each end).

The outer covering 20 will now be described. As shown in FIGS. 1 to 5, the outer covering 20 is formed in a flat, box-like shape corresponding to the shape of the electrode unit 30, and is open at its upper end. Also, since the outer covering 20 is housed in the cell case 40 in a state in which the electrode unit 30 is disposed inside (that is, as the electrode insertion unit 10), it is disposed between the inner wall faces (the wide faces 46 and the narrow faces 48) of the cell case 40 and the electrode unit 30, which electrically isolates the electrode unit 30 from the cell case 40. The outer covering 20 pertaining to this embodiment is composed of a sheet (film) of an insulating resin material, and is formed, for example, by bending a resin film cut out into a specific shape, and assembling this film. The outer covering 20 may, for example, have a constitution in which part of it (may be the bottom) is equipped with a terminal take-off hole for taking off a terminal, as long as insulation can be ensured between the electrode unit 30 and the cell case 40.

The electrode insertion unit 10 will now be described through reference to FIGS. 2 to 5. The electrode insertion unit 10 is made up of the electrode unit 30 and the outer covering 20, which is disposed (housed) inside the electrode unit 30, and is formed into a flat, box-like shape and housed inside the cell case 40.

As shown in FIGS. 3 and 5, the shape of the electrode insertion unit 10 is such that the thickness (the length in the thickness direction Q) $L_{1a}$ at the two ends 18 and 19 in the lateral direction P (the "two ends 18 and 19" here encompasses both "the two ends" in the lateral direction P and "a specific region including the two ends" unless otherwise specified) steadily decreases from the upper end 42 toward the bottom 44 of the cell case 40. Specifically, a vertical cross section in the thickness direction Q at the two ends 18 and 19 in the lateral direction P of the electrode insertion unit 10 has a tapered shape (or a V shape) in the longitudinal direction (typically the vertical direction) from the upper end 12 of the electrode insertion unit 10 corresponding to the upper end 42, to the bottom 14 of the electrode insertion unit 10 corresponding to the bottom 44. Accordingly, the thickness $L_{1a}$ of the two ends 18 and 19 at the upper end 12 corresponds to (substantially coincides with, or is very slightly smaller than) the length $L_2$ in the thickness direction Q of the internal space (or the narrow faces 48) of the cell case 40, but because it steadily decreases, it is less than the length $L_2$ at the bottom 14.

As shown in FIGS. 2 and 5, with the above-mentioned electrode insertion unit 10, the thickness $L_{1b}$ of the center portion 16, excluding the two ends 18 and 19 in the lateral direction P, is substantially constant from the upper end 42 of the cell case 40 to the bottom 44, and corresponds to the length $L_2$ in the thickness direction Q on the narrow face 48 of the cell case 40. Specifically, a vertical cross section in the thickness direction Q at the center portion 16 of the electrode insertion unit 10 has a U shape from the upper end 42 to the bottom 44.

Therefore, the thickness of the electrode insertion unit 10, that is, the thickness $L_{1a}$ at the two ends 18 and 19 of the center portion 16 in the lateral direction P and the thickness $L_{1b}$ of the center portion 16 excluding the two ends 18 and 19 coincide with each other at the upper end 12 of the cell case 40 ($L_{1a}=L_{1b}$), and correspond to the length $L_2$ in the thickness direction Q, but the two gradually diverge as they approach the bottom 14, with the thickness $L_{1a}$ at the two ends 18 and 19 becoming smaller (steadily decreasing) ($L_{1a}<L_{1b}$). Consequently, as shown in FIGS. 4 and 5, the thickness $L_{1a}$ of the electrode insertion unit 10 at (a region including) the two ends 18 and 19 steadily decreases from the center portion 16 side toward the two ends 18 and 19 in the lateral direction P, and the degree of this steady decrease gradually increases from the upper end 12 toward the bottom 14 (that is, from the upper end 42 toward the bottom 44 of the cell case 40). Specifically, the shape of a lateral cross section obtained by cutting the electrode insertion unit 10 in the lateral direction P is a flattened octagonal shape such as if obtained by cutting off the four corners of a flat rectangular shape. In addition, the shape of a lateral cross section of the electrode insertion unit 10 near the bottom 14 at which the degree of the steady decrease is greatest is an octagonal shape with the greatest cutting away of the corners (removed portions). Consequently, the electrode insertion unit 10 to be housed in the cell case 40 without the two ends 18 and 19 of the electrode insertion unit 10 and the rounded (R-shaped) corner components 45 of the cell case 40 interfering with each other, particularly at the bottom 44 (or the bottom 14).

As discussed above, with the electrode insertion unit 10 pertaining to this embodiment, a wound electrode unit can be used favorably as the electrode unit 30 that is a constituent element thereof. In this case, the lateral direction P is parallel to (the same as) the winding axis direction of the electrode unit 30. Consequently, the center portion 16 excluding the two ends 18 and 19 in the lateral direction P of the electrode insertion unit 10, and more precisely the portion where the thickness $L_{1b}$ is substantially constant from the upper end 12 toward the bottom 14, preferably corresponds to the active material layer provision component 38 of the electrode unit 30. Also, one of the ends 18 and 19 and the other one of the ends 18 and 19 in the lateral direction (winding axis direction) P preferably corresponds to the positive electrode and negative electrode sides respectively of the electrode unit 30, and the portions (regions) where the thickness $L_{1a}$ steadily decreases from the upper end 12 toward the bottom 14, which are specific regions including the two ends 18 and 19, preferably correspond to the positive electrode collection component 35 and the negative electrode collection component 37, respectively. There are no particular restrictions on which of the ends corresponds to the positive electrode (or negative electrode) side (in FIGS. 1 to 4, the end 18 corresponds to the positive electrode collection component 35, and the end 19 to the negative electrode collection component 37). If the various portions of the electrode unit 30 and the electrode insertion unit 10 are in a corresponding relation such as this, the electrode unit 30 will be disposed in the outer covering 20 such that the thickness near the bottom 14 at the positive electrode collection component 35 and the negative electrode collection component 37 in a state of sticking out from both sides of the active material layer provision component 38 will just be slightly flattened out (thinner), and no major deformation or buckling will occur, and the electrode unit 30 constitutes the electrode insertion unit 10 along with the outer covering 20.

There are no particular restrictions on the overall shape of the electrode insertion unit 10, as long as the shape of the bottom 14 (bottom face portion) corresponds to the shape of the electrode unit 30 constituting the electrode insertion unit 10. For example, as shown in FIG. 2 or 3, if the electrode unit 30 is a wound electrode unit, it may have a shape corresponding to the curvature of the side faces on the bottom 14 side of the flat, wound electrode unit 30 that has been rounded (R-shaped) or flattened. Also, if the electrode unit 30 is a laminated type of electrode unit, the shape of the bottom of the electrode insertion unit 10 may be flat.

Also, the electrode insertion unit 10 need only have an overall shape such as that discussed above, and the electrode unit 30 itself that is a constituent element of the electrode insertion unit 10 does not need to coincide with the overall shape of the electrode insertion unit 10 as discussed above. Therefore, there are no particular restrictions on the overall (external) shape of the electrode unit 30 alone. For example, the electrode unit 30 that is disposed inside the outer covering 20 and housed in the cell case 40 as the electrode insertion unit 10 may be such that terminals for positive and negative electrodes (not shown) are respectively connected to the two ends 18 and 19 in the lateral direction (winding axis direction) P thereof (that is, the portions corresponding to the positive electrode collection component 35 and the negative electrode collection component 37). Accordingly, with a electrode unit 30 in an embodiment in which the terminals are connected such that the two collection components 35 and 37 are sandwiched from both sides in the thickness direction Q in the winding axis center portion, the end face shape can be a gourd shape that is constricted in the middle. If a electrode unit 30 with such a shape is disposed in the outer covering 20, the shape of the electrode insertion unit 10 may be one that comprises two ends 18 and 19 such that the thickness $L_{1a}$ steadily decreases as discussed above.

Figure 6:
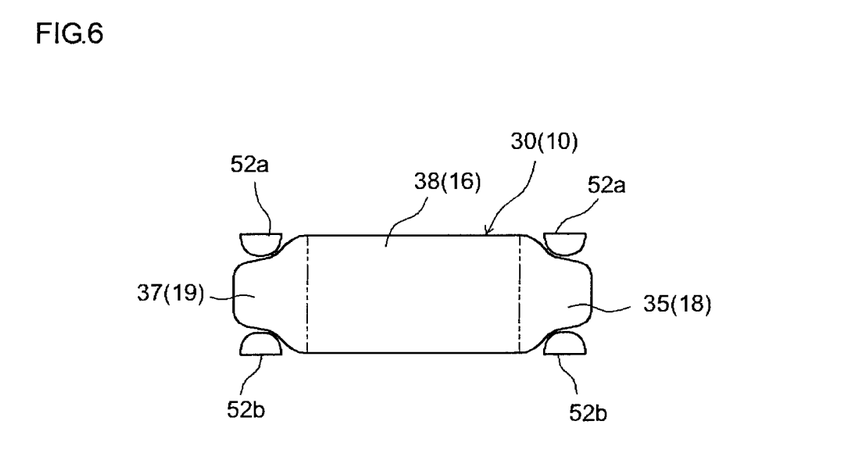
FIG. 6 is a diagram schematically illustrating a method for using guides to house an electrode unit (or an electrode insertion unit) in an outer covering (or a cell case)

Next, a method for constructing (producing) the cell 100 of this embodiment will be described through reference to FIGS. 1 to 6. FIG. 6 is a diagram schematically illustrating a method for using guides 52a and 52b to house the electrode unit 30 in the outer covering 20 (or the cell case 40) such that the thickness of the positive electrode collection component 35 and the negative electrode collection component 37 at the two ends in the winding axis direction (the thickness of the two ends 18 and 19 in the lateral direction P of the electrode insertion unit 10) decreases steadily.

First, the wound electrode unit 30 pertaining to this embodiment can be constructed in the same manner as the wound electrode unit of an ordinary lithium ion cell. Specifically, a slender positive electrode sheet 34, a slender negative electrode sheet 36, and two slender separator sheets 39 are laminated and wound in the lengthwise direction, and the coil thus obtained is flattened in a direction perpendicular to the winding axis direction to produce a flat shape.

The positive electrode sheet 34 can be produced by applying a positive electrode active material layer (typically by coating) in a specific width at one end in the lengthwise direction of a slender positive electrode collector sheet, and not coating the other end with the positive electrode active material layer, so as to provide a portion where the positive electrode collector is exposed. The same applies to the negative electrode sheet 36, which can be produced by applying a negative electrode active material layer at one end in the lengthwise direction of a slender negative electrode collector sheet, and providing a portion where the negative electrode collector is exposed at the other end.

Here, the positive electrode sheet 34 and the negative electrode sheet 36 are wound as follows. First, the positive electrode sheet 34, a separator 39, the negative electrode sheet 36, and a separator 39 are laminated in that order, and then this laminate is wound in a state in which the positions of the positive electrode sheet 34 and the negative electrode sheet 36 are shifted in the width direction (the widthwise direction). As a result, the active material layer provision component 38 is formed in which a portion provided with a positive electrode active material layer and a portion provided with a negative electrode active material layer are laminated in the center portion in the winding axis direction of the wound electrode unit 30 thus obtained. On one of the two sides of the active material layer provision component 38, that is, the two ends in the winding axis direction, the positive electrode collection component 35, which is produced by laminating the portion where the positive electrode collector is exposed, is formed so as to stick outward from the active material layer provision component 38, and on the other side, the negative electrode collection component 37, which is produced by laminating the portion where the negative electrode active material layer is exposed, is formed so as to stick outward from the active material layer provision component 38. With a wound electrode unit 30 obtained in this manner, a positive electrode lead terminal and a negative electrode lead terminal (not shown) are typically provided to the positive electrode collection component 35 and the negative electrode collection component 37, and these lead terminals are electrically connected to the positive electrode (external) terminal and the negative electrode (external) terminal, respectively.

The materials and members that make up this wound electrode unit 30 may themselves be the same as in the electrode unit of a conventional lithium ion cell, with no particular restrictions thereon. With the positive electrode sheet 34, a foil composed of aluminum (Al), nickel (Ni), titanium (Ti), or another such metal can be used favorably. One or more types of substance used in the past as positive electrode active materials in lithium ion cells can be used, with no particular restrictions thereon. Favorable examples include lithium-nickel compound oxides (an oxide containing lithium and nickel as constituent metal elements; includes those in which some of the nickel sites have been substituted with cobalt, aluminum, or another such metal element; typically $LiNiO_2$), lithium-cobalt compound oxides (typically $LiCoO_2$), lithium-manganese compound oxides (typically $LiMn_2O_4$), and other such lithium-transition metal compound oxides. For example, a strip of aluminum foil with a thickness of 5 to 20 µm (such as 15 µm) is used as a positive electrode collector, and a positive electrode active material layer whose main component is a lithium-nickel compound oxide is formed by a standard method in a specific region of the surface, which gives a favorable positive electrode sheet 34.

Meanwhile, with the negative electrode sheet 36, copper foil or another metal foil that is suited for a negative electrode can be used favorably for the negative electrode collector. One or more types of substance used in the past as negative electrode active materials in lithium ion cells can be used, with no particular restrictions thereon. Favorable examples include graphite carbon, amorphous carbon, and other such carbon-based materials, lithium-transition metal oxides (such as lithium-titanium oxide), and lithium-transition metal nitrides. For example, a strip of copper foil with a thickness of 5 to 20 µm (such as 10 µm) is used, and a negative electrode active material layer whose main component is a carbon-based material (typically graphite) is formed by a standard method in a specific region of the surface, which gives a favorable negative electrode sheet 36.

Examples of separators 39 that can be used favorably between the positive electrode sheet 34 and the negative electrode sheet 36 include those made of synthetic resins (such as polyethylene, polypropylene, and other such polyolefins). For example, a porous separator sheet composed of a polyolefin resin and having a thickness of 5 to 30 µm (such as 25 µm) can be used to advantage. When a solid or gelled electrolyte is used, a separator made of a commonly used synthetic resin (such as one made of polypropylene) may be unnecessary (that is, in this case the electrolyte itself serves as a separator).

The outer covering 20 pertaining to this embodiment can be produced preferably using an insulating resin material in the form of a sheet (film). For instance, a sheet of resin material is cut into a specific shape (such as a shape obtained by opening up and spreading out the above-mentioned flat box), and then thus cut-out sheet is bolded into the shape of a flat box to obtain a favorable outer covering 20. Or, a plurality of sheets or a plurality of parts may be stuck together (assembled) by welding or the like to form the above-mentioned box shape. The sheet of insulating resin material used for the outer covering 20 is preferably a resin material with high heat resistance and good insulating properties; for example, polyethylene, polypropylene, and other such polyolefin resin materials can be used to advantage. The thickness of this resin material is preferably about 100 µm, but can be suitably adjusted according to the conditions of the cell 100 and so forth (such as the proportion of the internal space in the cell case 40 accounted for by the electrode unit 30). If sheet materials are stuck together as mentioned above, heat fusion by a heat bar or the like can be employed favorably, but the method is not limited to this, and ultrasonic welding, laser welding, or another such welding method can be used as desired. An outer covering 20 formed from a thin sheet of material is preferable because when it is housed in the cell case 40 along with the electrode unit 30, the space accounted for by the outer covering 20 can be kept to a minimum.

When the flat electrode unit 30 is housed inside the flat, box-like outer covering 20, the electrode unit 30 is housed (typically by insertion) so that the winding axis direction of the electrode unit 30 is kept parallel to the open face at the upper end of the outer covering 20 (a plane including the lateral direction P and the thickness direction Q), and so that a wide face of the outer covering 20 is opposite (parallel to) the wide face 32 of the electrode unit 30. This constitutes the electrode insertion unit 10. With the electrode insertion unit 10 at this point, the regions which include the two ends 18 and 19 in the lateral direction P, and in which the thickness $L_{1a}$ steadily decreases from the center portion 16 side toward the two ends 18 and 19, correspond to the positive electrode collection component 35 and the negative electrode collection component 37, respectively, of the electrode unit 30.

There are no particular restrictions on the method for inserting the electrode unit 30 into the outer covering 20 here, but, for example, the pair of roller guides 52a and 52b shown in FIG. 6 may be employed, and insertion can be easily accomplished by disposing these at two places above the opening provided at the upper end of the outer covering 20. Specifically, the distance across the space flanked by the opposing guides 52a and 52b is set to the length of the bottom in the thickness direction Q at the two ends in the lateral direction P of the outer covering 20 (that is, the thickness $L_{1a}$ of the bottom 14 at the two ends 18 and 19 of the electrode insertion unit 10). Then, when the electrode unit 30 is inserted, the two ends of the electrode unit 30 in the winding axis direction are disposed in the above-mentioned space between the guides 52a and 52b, and if the electrode unit 30 is inserted into the outer covering 20 while pressing the two ends of the electrode unit 30 into this space, the thickness of at least the portion of the positive electrode collection component 35 and negative electrode collection component 37 flanked by the guides 52a and 52b will coincide with the distance across this space, so the electrode unit 30 can be easily installed through the opening at the upper end of the outer covering 20.

When the outer covering 20 is formed from a sheet of insulating resin material as discussed above, the electrode unit 30 may be disposed at a specific location on the sheet of this material that has been cut out into a specific shape, and the outer covering 20 may be assembled in a state in which the electrode unit 30 is disposed. In such a case, installation difficulties can be eliminated by inserting the electrode unit 30 into the flat outer covering 20.

The electrode insertion unit 10 obtained as above is installed in the cell case 40. The electrode insertion unit 10 here is such that the thickness $L_{1a}$ of the two ends 18 and 19 in the lateral direction P thereof steadily decreases from the upper end 12 toward the bottom 14 of the electrode insertion unit 10, and even at the two ends 18 and 19 (that is, the portion corresponding to the positive electrode collection component 35 and negative electrode collection component 37 of the electrode unit 30), the thickness $L_{1a}$ steadily decreases from the center portion 16 side toward the two ends 18 and 19, and the degree of this decrease gradually increases moving from the upper end 12 in the longitudinal (vertical) direction toward the bottom 14. Since the electrode insertion unit 10 is shaped like this, the electrode insertion unit 10 can be easily installed through the opening 43 formed in the upper end 42 of the cell case 40. Also, the insertion can be accomplished smoothly, without the electrode insertion unit 10 interfering with the corner components 45 of the inner wall faces (the wide faces 46 and the narrow faces 48) of the cell case 40, and the wrinkling, bending, tearing, and deformation caused by the above-mentioned interference of the electrode unit 30 or the outer covering 20 constituting the electrode insertion unit 10 at the two ends 18 and 19 of the electrode insertion unit 10 in the lateral direction P can be effectively prevented. Therefore, the adverse effect that such problems have on cell performance (such as internal short circuiting) can be prevented from occurring.

In installing the electrode insertion unit 10 in the cell case 40, the electrode insertion unit 10 may be preformed in a shape (end shape) such that the thickness $L_{1a}$ of the two ends 18 and 19 in the lateral direction P steadily decreases, and the electrode insertion unit 10 may be installed (inserted) in the cell case 40 after this. Specifically, the outer covering 20 shaped as above may be used to preform the electrode insertion unit 10 with the above-mentioned end shape. Alternatively, the two ends 18 and 19 may be formed in the above-mentioned shape simultaneously with the insertion into the cell case 40 (or immediately prior thereto). In the latter case, a cuboid housing can be used that has a simple flat shape in which the thickness of the two ends in the lateral direction P does not steadily decrease. In this case, for example, as shown in FIG. 6, using the guides 52a and 52b, etc., allows the end shape to be formed favorably. When the guides 52a and 52b are applied to a cuboid electrode insertion unit having a simple flat shape and that is obtained by disposing the electrode unit 30 inside this housing, the above-mentioned end shape is formed during insertion into the cell case 40, so the electrode unit 30 can be easily inserted into the cell case 40 as an electrode insertion unit having this shape.

After the electrode insertion unit 10 has thus been installed in the cell case 40, a suitable electrolyte (typically and electrolytic solution) is poured in through an opening (not shown) formed in the cell case 40, for example. Thus, the cell 100 can be constituted by sealing the cell case 40. A nonaqueous electrolytic solution obtained by dissolving a suitable about (such as a concentration of 1 M) of a suitable support salt (a lithium salt such as lithium hexafluorophosphate ($LiPF_6$)) in a nonaqueous solvent (such as a mixture of diethyl carbonate and ethylene carbonate) can be used favorably as the above-mentioned electrolyte, for example.

The present invention was described above by giving a preferred embodiment, but what was discussed above is not intended to be limiting in nature, and various modifications are possible. For instance, an example of another embodiment that is different from the one given above is a cell equipped with the following electrode insertion unit. For example, this electrode insertion unit may be one constituted by a housing molding (such as by extrusion molding) in a flat, box-like shape using a thermosetting and insulating resin material or the like. Alternatively, the electrode insertion unit may be constituted by a housing obtained by bending a metal sheet of aluminum or the like and subjecting its side faces to welding, etc., to form a specific shape, and then coating the inner wall faces with an insulating resin. Constituting an electrode insertion unit by thus installing an electrode unit in a housing can be easily accomplished by utilizing the guides 52a and 52b as discussed above. With the cell in this embodiment, there is no need to assemble the housing into a box shape from a sheet of material, and when the electrode insertion unit composed of the housing and the electrode unit is inserted into the cell case, the occurrence of wrinkling, bending, and other such problems in the electrode insertion unit (an outer casing) due to interference with the cell case can be prevented to a higher degree. Accordingly, a decrease in cell performance (such as the insulation performance between the cell case and the electrode unit) caused by wrinkling and so forth can be effectively avoided, allowing a cell with better performance to be obtained.

Also, the type of cell is not limited to a lithium ion cell, and may instead be any of various cells with different types of electrolyte or the materials constituting the electrode unit, such as a lithium secondary cell whose negative electrode is made of lithium metal or a lithium alloy, a nickel hydrogen cell, a nickel cadmium cell, or an electric double layer capacitor.

Figure 7:
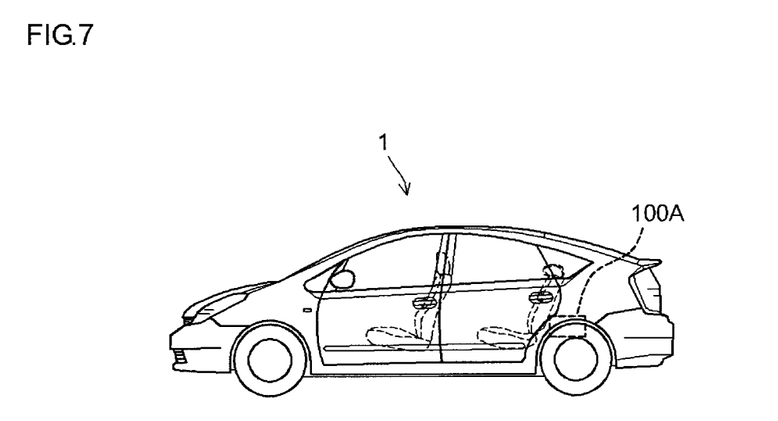
FIG. 7 is a side view schematically illustrating a vehicle equipped with a cell pertaining to an embodiment of the present invention.

Furthermore, as shown in FIG. 7, the cell 100 pertaining to this embodiment can be used particularly favorably as a power supply for a motor (electric motor) installed in an automobile or other such vehicle. Therefore, as shown schematically in FIG. 7, the present invention can provide a vehicle (typically an automobile, and particularly a hybrid automobile, an electric bicycle, a fuel cell automobile, or another such automobile equipped with an electric motor) 1 in which a plurality of the cells 100 are arranged to construct a battery pack 100A, and this battery pack 100A is used as a power supply.

The invention claimed is:

1. A prismatic cell comprising:
    a prismatic cell case; and
    a flat electrode insertion unit housed in the cell case, the electrode insertion unit including:
        an electrode unit, with a flat shape, including a positive electrode comprising a positive electrode collector and a positive electrode active material layer provided to the positive electrode collector, a negative electrode comprising a negative electrode collector and a negative electrode active material layer provided to the negative electrode collector, and separators between the positive electrode and the negative electrode; and
        an outer covering formed of a sheet-form insulating material, encasing the electrode unit and having a shape corresponding to the electrode unit, provided between the electrode unit and the cell case to isolate the electrode unit from the cell case; wherein
    a center portion of the electrode unit in a specific direction as viewed from a wide face thereof forms an active material layer provision component laminated at a portion where the positive electrode active material layer is provided and a portion where the negative electrode active material layer is provided,
    one end, of two ends of the electrode unit in the specific direction, forms a positive electrode collection component laminated at a portion where no positive electrode active material layer is provided and where a positive electrode collector is exposed, and the other end forms a negative electrode collection component laminated a portion where no negative electrode active material layer is provided and where a negative electrode collector is exposed,
    the electrode insertion unit is housed, from an opening formed at an upper end of the cell case, in the cell case in a lateral direction in which the positive electrode collection component and the negative electrode collection component are disposed along from the upper end to the bottom at both ends of a wide face of the cell case,
    a thickness of the electrode insertion unit at both ends in the lateral direction gradually decreases from the upper end to the bottom of the cell case along the entire width of the electrode insertion unit,
    the positive electrode collection component is disposed at a first end of the wide face of the cell case, and has a first thickness gradually decreasing from the upper end toward the bottom of the cell case, and
    the negative electrode collection component is disposed at a second end of the wide face of the cell case opposite the first end, and has a second thickness gradually decreasing from the upper end toward the bottom of the cell case.

2. The cell according to claim 1, wherein, in the electrode insertion unit, the thickness of the center portion excluding the both ends in the lateral direction is substantially constant from the upper end to the bottom of the cell case.

3. The cell according to claim 2, wherein, in a specific region including the both ends of the electrode insertion unit in the lateral direction, the thickness of the electrode insertion unit gradually decreases from the side closer to the center in the lateral direction toward the both ends, and the degree of the gradual decrease gradually increases in a direction extending from the upper end to the bottom of the cell case, which is a direction that is perpendicular to the lateral direction.

4. The cell according to claim 1, wherein:
    the positive electrode has a sheet form,
    the negative electrode has a sheet form,
    the electrode unit is a wound electrode unit in which the positive electrode and the negative electrode are laminated via a separator and wound, and
    a winding axial direction of the electrode unit is parallel to the lateral direction.

5. The cell according to claim 1, wherein the outer covering is formed from a resin material.

6. A vehicle comprising the cell according to claim 1.

* * * * *